(12) United States Patent
Okuno et al.

(10) Patent No.: US 8,116,305 B2
(45) Date of Patent: Feb. 14, 2012

(54) MULTI-PLANE CELL SWITCH FABRIC SYSTEM

(75) Inventors: Michitaka Okuno, Kokubunji (JP); Mitsuo Yamamoto, Hino (JP); Isao Kimura, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 110 days.

(21) Appl. No.: 12/410,655

(22) Filed: Mar. 25, 2009

(65) Prior Publication Data

US 2009/0252168 A1     Oct. 8, 2009

(30) Foreign Application Priority Data

Apr. 2, 2008    (JP) .................. 2008-096016

(51) Int. Cl.
  *H04L 12/50*      (2006.01)
  *H04Q 11/00*      (2006.01)
(52) U.S. Cl. ........ 370/360; 370/367; 370/386; 370/387; 370/388
(58) Field of Classification Search .......... 370/412–419, 370/395.6, 395.61, 463, 360, 363, 367, 368, 370/386–388, 389, 392, 394, 395.1, 395.71, 370/400, 429
See application file for complete search history.

(56) References Cited

U.S. PATENT DOCUMENTS

| | | | |
|---|---|---|---|
| 5,550,978 A | | 8/1996 | Takahashi et al. |
| 5,740,373 A * | | 4/1998 | Isaka ........................... 709/237 |
| 6,072,772 A * | | 6/2000 | Charny et al. ................. 370/229 |
| 7,095,744 B2 | | 8/2006 | Iny |
| 7,342,887 B1 * | | 3/2008 | Sindhu et al. ................. 370/235 |
| 7,639,679 B2 * | | 12/2009 | Noirie et al. .................. 370/388 |
| 2002/0057712 A1 * | | 5/2002 | Moriwaki et al. ............. 370/463 |
| 2005/0201400 A1 * | | 9/2005 | Park et al. ...................... 370/412 |
| 2005/0207417 A1 * | | 9/2005 | Ogawa et al. ................. 370/390 |
| 2008/0159149 A1 | | 7/2008 | Okuno |
| 2008/0279195 A1 * | | 11/2008 | Okuno ....................... 370/395.6 |

FOREIGN PATENT DOCUMENTS

| | | |
|---|---|---|
| JP | 5-327777 A | 12/1993 |
| JP | 6-187311 A | 7/1994 |
| JP | 2008-92485 A | 4/2008 |
| JP | 2009253422 * | 10/2009 |
| WO | 02/43329 A1 | 5/2002 |

OTHER PUBLICATIONS

JapaneseOfficeAction2008096016, 2008.*
AssigneeOfficeAction2008096016, 2008.*

* cited by examiner

*Primary Examiner* — Ayaz Sheikh
*Assistant Examiner* — Chuong T Ho
(74) *Attorney, Agent, or Firm* — Mattingly & Malur, PC

(57) ABSTRACT

A multi-plane cell switch fabric system prevents a decrease of the effective switching capacity when switching the variable-length packets. Distribution units classify input variable-length packets for each address, arranges the packets by a first division length unit, divides the packets into fixed-length cell payloads by a second division length unit that is an integer multiple being twice or more as large as the first division length unit, and forms a fixed-length cell by providing destination information, a source ID, a sequential number, and packet head tail information to each of the cell payloads. The cells are distributed to all the switching units one by one whenever the cells are collected to be the same number as the plural switching units. The reordering units classify the cells, reorder the sequential number in an original order, and reassemble the packets by the packet head tail information of the cell.

7 Claims, 12 Drawing Sheets

MULTI-PLANE CELL SWITCH FABRIC SYSTEM

CLAIM OF PRIORITY

The present application claims priority from Japanese patent application JP2008-096016 filed on Apr. 2, 2008, the content of which is hereby incorporated by reference into this application.

BACKGROUND OF THE INVENTION

1. Field of the Invention

The present invention relates to a switch fabric system used in a packet switching device, and, in particular, to a technology that effectively prevents switching capacity of plural switches operating separately from each other from decreasing.

2. Description of the Related Art

In a network transmission device such as a router, a switch fabric system is used to switch variable-length packet data between functional blocks in the device. As a switching unit in one method for performing switching of a large-capacity line (high-speed line), there is a multi-plane cell switch fabric system (parallel switch) that includes M switch LSIs including a port of a speed of 1/M with respect to a required line speed that uses the switch LSIs in parallel, wherein the switch LSIs are operated at a relatively low speed.

As a multi-plane switch fabric technology in the related art, there is a system that uses plural ATM (Asynchronous Transfer Mode) switches in parallel as described in JP-A-5-327777. Since this system originally divides a fixed-length ATM cell into a number of sub-cells equal to the number of ATM switches in the system, cells can flow to all of the plural ATM switches. Therefore, it is possible to use the effective switching capacity of the switch fabric system until the switching capacity is equal to the maximum switching capacity. However, with a variable-length packet of Ethernet (registered trademark), etc., since a large number of non-effective parts occur among the sub-cells depending on the packet length, the effective switching capacity of the switch fabric system decreases. Moreover, since there is a need to completely synchronize all the ATM switches, when packets having a small grain size flow through the large-capacity line, it is difficult to process them.

A method of dividing a data stream into plural data blocks having a predetermined length L and dividing them into m sub-data blocks (bit slice) to transmit them to the plural ATM switches in parallel is disclosed in JP-A-6-187311. However, even in the case of using the above method, the number of divided sub-data blocks is not equal to the number of ATM switches, thus, the effective switching capacity decreases. Further, even if the number of resolved sub-data blocks is equal to the number of ATM switches, when the original data block is sufficiently smaller than L or somewhat larger than L, the effective switching capacity decreases due to padding in order to conform the data block length to L.

In WO02/43329, the same time stamp in addition to an address number, a transmission source number, and a cell dividing number is added to the cell generated from the same packet and the cells are distributed to the plural switching units. A method of allowing the switching unit to preferentially select old time stamps and a reordering unit to sequentially reassemble cells and packets belonging to the same flow in order from the time stamps having old values is disclosed. With the above method, the multi-plane switch fabric system can be configured by using any number of asynchronously operating switching units; however, the exchanging capacity of the switch fabric system decreases depending on the packet length.

BRIEF SUMMARY OF THE INVENTION

The problem of the decrease of the switching capacity of the related art can be described as attributable to the division loss of the switch and the division loss of the packet.

First of all, as shown in FIG. 1, in a multi-plane switch fabric system that is an object of the present invention, each of N distribution units 100 (100-1 to 100-N) corresponding to inputs of the switch fabric system distributes and switches variable-length packets to each of the M switching units 200 (200-1 to 200-M) as they are, or distributes and switches cells, which divides the variable-length packets into fixed-length packets, to each of the M switching units 200-1 to 200-M, and each of the M switching units 200-1 to 200-M rearranges the cells in the transmitted order and reassembles and outputs the packets or rearranges and outputs the packets in the transmitted order to an address corresponding to one of the N reordering units 300 (300-1 to 300-N), such that the multi-plane switch fabric system can realize switching with a desired large-capacity line.

FIG. 2 shows a relationship between the variable-length packet and the fixed-length cell according to the present invention. In general, a packet transmitting device such as a router with the built-in switch fabric system analyzes the contents of received packet 10 and generates analyzed information 11 including an address, a packet length, and priority, etc. It divides a packet 20 including the analyzed information 11 into the specified fixed length so that the packet becomes a cell payload 32. When the packet does not reach the fixed length, a value 0 is padded to, for example, the last cell payload by a required amount, such that the packet has the fixed length. Cell headers 31 are provided to each cell payload 32 to form a fixed-length cell 30.

The cell header 31, after passing the cell 30 from the distribution units 100-1 to 100-N to the reordering units 300-1 to 300-N of the address via any of the switching units 200-1 to 200-M, includes information required to reassemble the packets 20 including the analyzed information 11 in the original order.

Herein, in the switch fabric system shown in FIG. 1, it is assumed that N=4 and M=4, that is, there are respectively four of the distribution units 100-1 to 100-N, the reordering units 300-1 to 300-N, and the switching units 200-1 to 200-M, and the case where the packets having a slightly smaller size than the cell payload length are input to the distribution units 100-1 to 100-N is considered. The part that does not reach the fixed length specified by the cell payload length is subjected to padding so that each packet becomes a cell payload having the fixed length.

The case where packets to address 1, address 2, address 3, and address 4 are sequentially input in order by one packet is shown as pattern 40 in FIG. 3. In FIG. 3, x of Dx-y represents an address and y of Dx-y represents a y-th packet to the address x.

First of all, an operation for synchronizing four switching units 200-1 to 200-4 will be described. The packet formed into the cell is sequentially transmitted to each of the switching units 200-1 to 200-4 in the arrived order. Moreover, a type in which the cells generated from the above-mentioned pattern 40 are distributed and transmitted to the four switching units 200-1 to 200-4 is shown as pattern 50 in FIG. 3. In this example, since the four switching units 200-1 to 200-4 should be synchronously operated, three of the four switching units should include a dummy cell 52 carrying invalid information in order to match the timing of these switching units. This dummy cell part is observed as the division loss of the switch, such that the switching capacity of the switch fabric system decreases.

In order to show in detail the division loss of the switch, FIG. 4 shows a relationship between the packet length and throughput in the synchronous multi-plane cell switch fabric system. The transverse axis shows the packet length (byte) and the longitudinal axis shows throughput (Gbps: Gigabit per second), respectively. In FIG. 4, Ethernet corresponding to 100 Gbps as an input line is exemplified. Also, FIG. 4 shows a correlation between line effective speed 500 of Ethernet and core effective speed 510 of the multi-plane cell switch fabric system for switching the Ethernet packets. Herein, the line effective speed 500 means how many valid packets are included in the data that flows on the network line and the effective value of the line effective speed varies depending on the packet length. It can be calculated as follows.

Line effective speed 500=(packet length/ROUNDUP ((packet length+preamble length)/4)×(4+least interframe gap length))×line speed.

Further, ROUNDUP means rounding-up the numbers beyond the decimal point of the calculated value. Herein, if the preamble length is 8 bytes, the least interframe gap length is 12 bytes, and the line speed is 100 Gbps, Line effective speed 500=(packet length/(ROUNDUP ((packet length+8)/4)×4+12))×100 Gbps.

Further, the core effective speed 510 means how many packets are included in the data that flows on a line within an LSI chip (core) and is a value calculated by the following equation in the distribution units 100-1 to 100-N and the reordering units 300-1 to 300-N. Like the line effective speed, this value varies depending on the packet length.

Core effective speed 510=(packet length/(ROUNDUP ((packet length−FCS length+analyzed information length)/cell payload length)×processing cycle corresponding to 1 cell))×operation frequency of core.

Herein, if FCS, which is a Frame Check Sequence, is four bytes in Ethernet, the analyzed information length is 32 bytes, the cell payload length is 128 bytes, the number of processing cycles corresponding to 1 cell is 4 cycles, and the operation frequency of the core is 600 MHz, Core effective speed 510=(packet length/ROUNDUP ((packet length−4+32)/128)×4))×600 MHz.

Further, when four switching units 200-1 to 200-4 are used in the entire multi-plane cell switch fabric system, the core effective speed of each of the switching units 200-1 to 200-4 may be ¼ of the above-mentioned value. By using the four switching units 200-1 to 200-4 in parallel, the entire core effective speed of the switching units in the multi-plane cell switch fabric system has the same value as the core effective speed of the above-mentioned distribution units 100-1 to 100-4 and reordering units 300-1 to 300-4.

An area 511 where the value of the core effective speed 510 of the multi-plane cell switch fabric system is less than the line effective speed is a packet length area adversely influenced due to the division loss of the switch. Since the switching capacity is insufficient in this area, a loss of packets occurs.

Next, the case where the four switching units 200-1 to 200-4 are asynchronously operated will be described with reference to FIG. 5. Further, in FIG. 5, x of Dx-y represents an address and y of Dx-y represents a y-th packet to the address x. Moreover, in FIG. 5, a of Sa-b represents a transmission source and b represents the b-th packet number from the transmission source a. When each of the switching units 200-1 to 200-4 is asynchronously operated, since each of them can control the output of the input cell independently from the other switching units, the distribution units 100-1 to 100-4 can deliver cells to all the distribution units 200-1 to 200-4 without inserting the dummy cell as shown in pattern 55 even if there is an input of pattern 40 of FIG. 5 (the same as the input of pattern 40 of FIG. 3) for the distribution units 100-1 to 100-4.

However, when pattern 40 of FIG. 5 is input to all the distribution units 100-1 to 100-4, there is a problem in the situation where the cell to address 1 is allocated to the switching unit 1, the cell to address 2 is allocated to the switching unit 2, the cell to address 3 is allocated to the switching unit 3, and the cell to address 4 is allocated to the switching unit 4 occurs in any of the distribution units 100-1 to 100-4.

When the cells are observed in the reordering unit 1 corresponding to the address 1 at any timing, as shown in pattern 60 of FIG. 5, it seems that the cells from all the distribution units 100-1 to 100-4 pass through switching unit 1 only.

If this situation continues, since the target address of the specific switching unit 200-1 to 200-4 is congested, a method of allowing the distribution unit 100-1 to 100-4 to take a load balance so as to use another of the switching units 200-1 to 200-4 is considered. However, since the distribution units 100-1 to 100-4 cannot physically know each other's momentary situation at the same instant, it is possible to allow the other distribution units 100-1 to 100-4 to select the same switching units 200-1 to 200-4 alternatively, which are not concurrently congested. In this case, the decrease of the switching capacity also occurs due to the division loss of the switch like in FIG. 4.

Further, although the implementing cost increases, there is a possibility that a large buffer memory may be included in the reordering unit, allowing the situation where the cell passes through all the switching units 200-1 to 200-4, as currently shown in pattern 61. Finally, however, since the cells are reordered for each transmission source in the reordering units 300-1 to 300-4 and packet reassembling should be performed, the latency from the distribution units 100-1 to 100-4 to the reordering units 300-1 to 300-4 becomes large in proportion to the number of switching units 200-1 to 200-4, which causes a considerable delay of the switch fabric system even if the switching capacity increases.

Next, the problem of the division loss of the packets will be described with reference to FIG. 7. FIG. 7 shows a case where there are three packets 20 classified for each address in a distribution unit 100 and these packet lengths are slightly larger than the cell payload length 401. At this time, although two cells are generated from one packet, most of the second cell is not valid data but padding. As the percentage occupied by the padding in the cell becomes large, the switching capacity decreases in the multi-plane cell switch fabric system. The decrease of this switching capacity is called division loss of the packet.

In order to show in detail the division loss of the packet, FIG. 8 shows a relationship between the packet length and the throughput in the multi-plane cell switch fabric system. The prerequisite conditions and the method of FIG. 8 are the same as FIG. 4, except that of the each switching units 200-1 to 200-M is asynchronously operated. The area 511 where the core effective speed 510 is less than the line effective speed 500 is the packet length area adversely influenced by the division loss of the packet. Since the switching capacity is insufficient in this area, the loss of the packet occurs.

One method to avoid the generation of the above-mentioned division loss of the packet is to reduce the length of the cell payload. As a detailed example, FIG. 9 shows the division of the packet in the case of using a cell payload length 400 of 32 bytes, that is, a size of ¼ with respect to the cell payload length 401 of FIG. 7. As the cell payload length becomes short, the padding area is small, such that the effective switching capacity can be improved. FIG. 10 shows a relationship between the packet length and the throughput in the multi-plane cell switch fabric system in the case of FIG. 9. The remaining conditions and the method of FIG. 10 are the same as FIG. 8, except that the cell payload length is 32 bytes, which is the prerequisite condition. Herein, since there is an area 511 where the core effective speed 510 is less than the line effective speed 500, the switching capacity is not insufficient.

However, when the cell payload length decreases, there is a problem that it is difficult to realize sufficient switching capacity if the line is at high speed. For example, when the cell payload length is 32 bytes, the time required to process one cell in each of the reordering units 300-1 to 300-N or the distribution units 100-1 to 100-N in the multi-plane cell switch fabric system is only 1.5 ns under the condition in FIG. 10. Assuming that the operation frequency of the logic is 666 MHz, this is only 1 cycle. In particular, it is very difficult in general to perform a complicated operation such as scheduling, which is one of the important processes of the distribution units 100-1 to 100-N, and the reordering of the cells in order, which is one of the important processes of the reordering units 300-1 to 300-N, etc., in one cycle. In other words, since it is difficult to use the method to simply decrease the cell payload length, the method is not realistic.

The reason why, in the multi-plane cell switch fabric system in the related art, the switching capacity of the switch fabric system decreases due to the existence of the division loss of the switch and the division loss of the packet has been described. Moreover, the reason why these problems cannot be resolved by only simple scheduling or decreasing the cell payload length has also been described.

Considering the above-mentioned aspects, the technical problem of the present invention is to provide a switch fabric system that can prevent the decrease of the effective switching capacity of a multi-plane cell switch fabric system switching a variable-length packet.

In order to solve the above mentioned problem, the present invention provides a multi-plane cell switch fabric system including: plural distribution units corresponding to inputs of a switch fabric system; plural reordering units corresponding to outputs of the switch fabric system; and plural switching units each asynchronously performing data switching from the distribution unit to the reordering unit, wherein the distribution unit includes a mechanism that arranges input variable-length packets at a first division length unit classified for each address, a mechanism that divides the packets into fixed-length cell payloads at a second division length unit that is an integer multiple being twice or more as large as the first division length unit and forms the fixed-length cell by providing, as a cell header, at least destination information, a source ID, a sequential number, and packet head tail information to the cell payload; and a mechanism that distributes the cells to all the distribution units one by one whenever the cells collected are the same number as the switching units, where the reordering unit includes a mechanism that classifies the cells by the source ID of the cell received through the plural switching units, and reorders the sequential number in an original order, a mechanism that reassembles the packets by the packet head tail information of the cell, and a mechanism that outputs the reassembled packets.

Moreover, the present invention provides a multi-plane cell switch fabric system including: plural distribution units, plural reordering units, plural switching units each asynchronously performing data switching from the distribution units to the reordering units, wherein the distribution unit includes a mechanism that divides input variable-length packets into fixed-length cell payloads classified for each address, and forms the fixed-length cell by providing, as a cell header, at least destination information, a source ID, a sequential number, and packet head tail information to each of the cell payloads, and a mechanism that distributes the cells to all the switching units one by one whenever the cells are collected to be the same number as the switching units, where the reordering unit includes a mechanism that classifies the cells by the source ID of the cell received through the plural switching units, and reorders a sequential number in an original order, a mechanism that reassembles the packets by the packet head tail information of the cell, and a mechanism that outputs the reassembled packets.

With the present invention, even when the variable-length packet is switched, it can suppress the division loss of the switch as well as the division loss of the packet to the minimum requirement. For this reason, the present invention can configure a multi-plane cell switch fabric system that decreases the effective switching capacity less than the method according to the related art.

DETAILED DESCRIPTION OF THE INVENTION

Hereafter, the best mode to carry out the present invention will be described in detail with reference to the accompanying drawings.

First Embodiment

Figure 1:
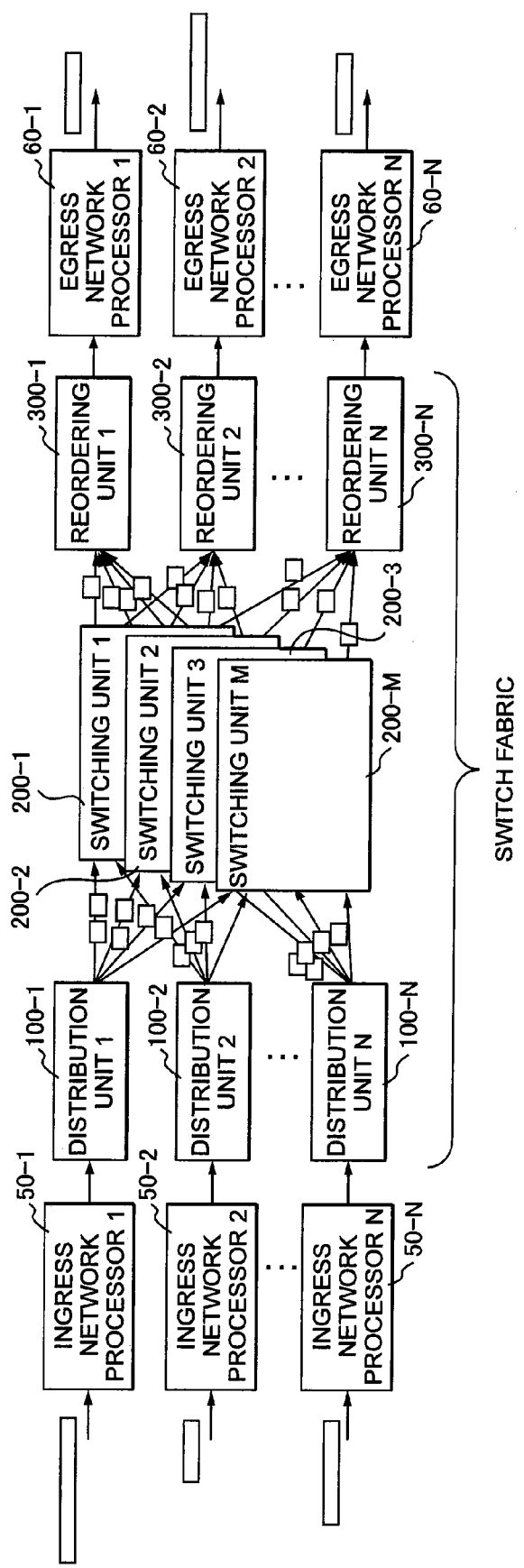
FIG. 1 is a block diagram showing a configuration of a multi-plane cell switch fabric system according to a first embodiment.
Figure 2:
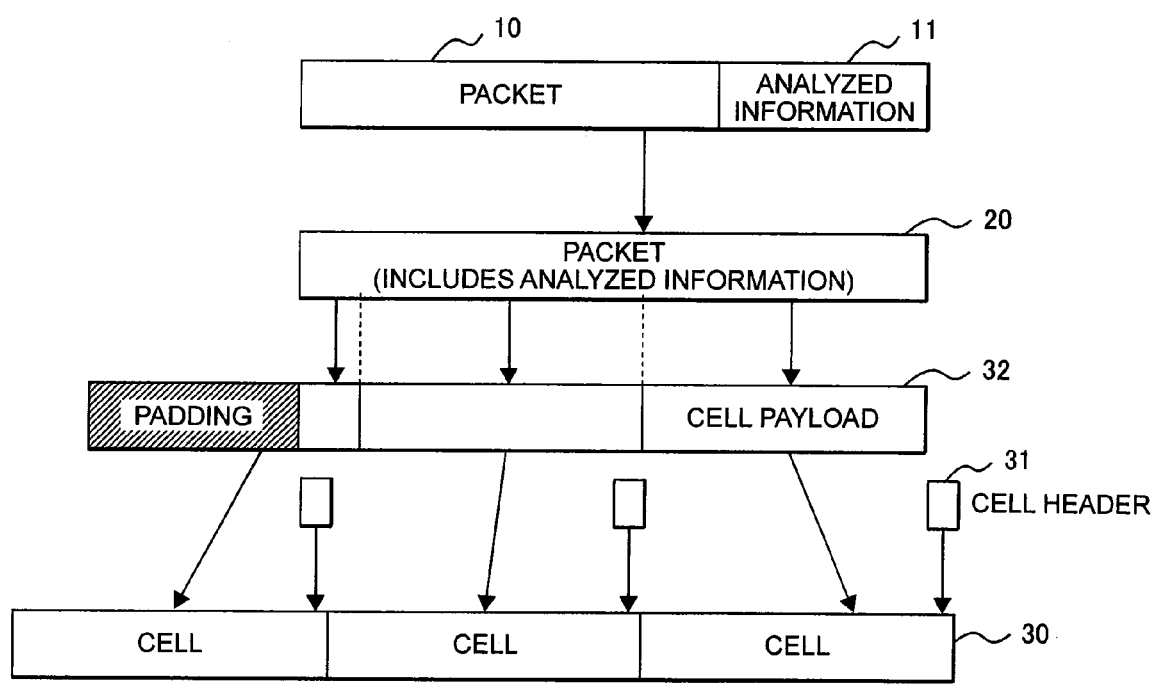
FIG. 2 is a schematic diagram showing an appearance where a fixed-length cell is generated from a variable-length packet.
Figure 3:
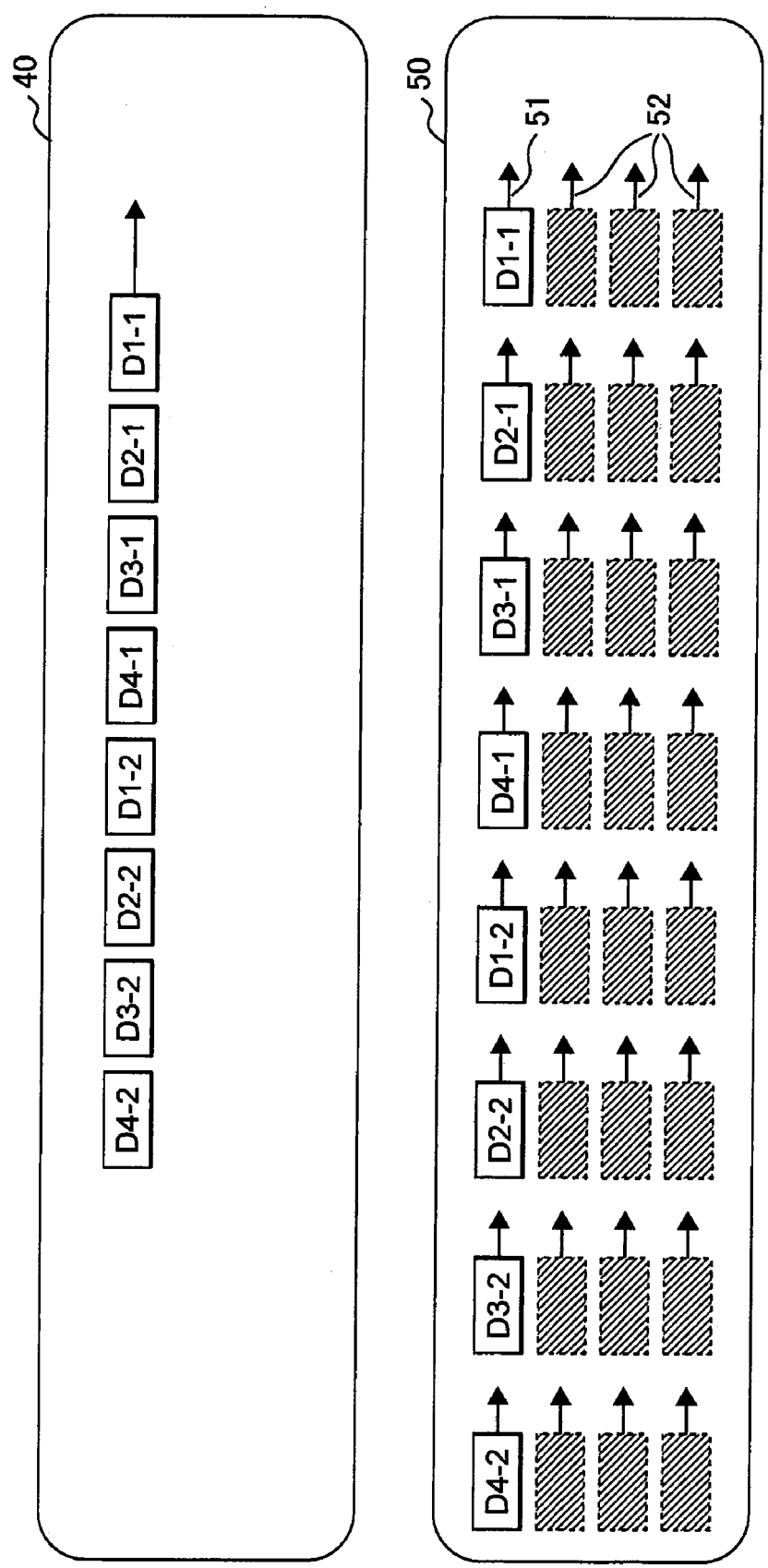
FIG. 3 is a diagram showing a relationship example between a packet and a cell payload length.
Figure 4:
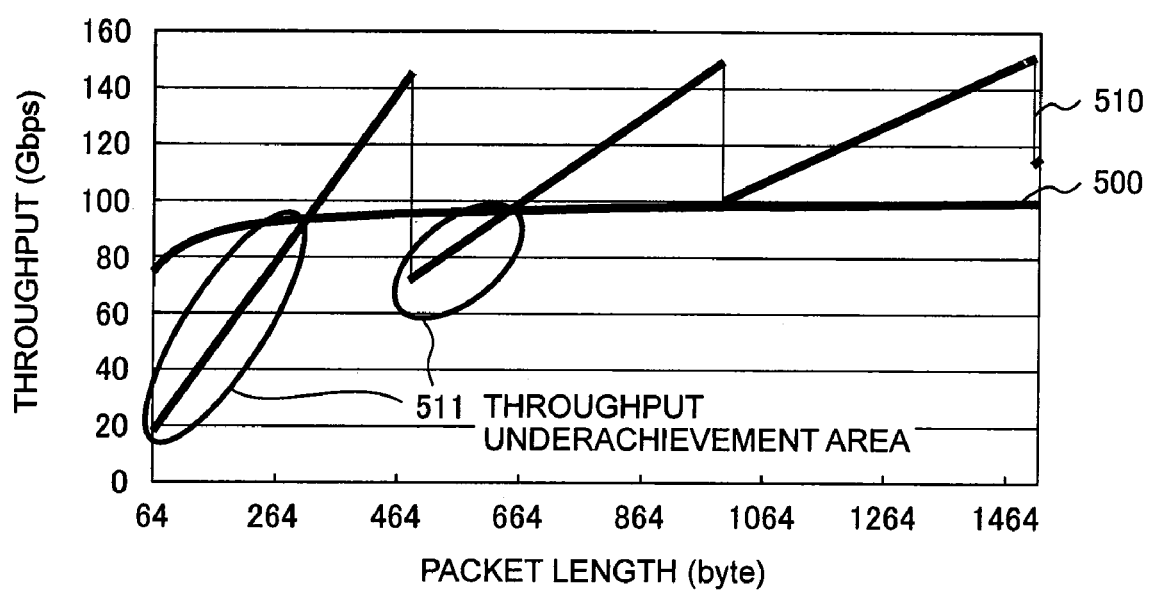
FIG. 4 is a diagram showing a correlation example between a packet length and throughput.
Figure 5:
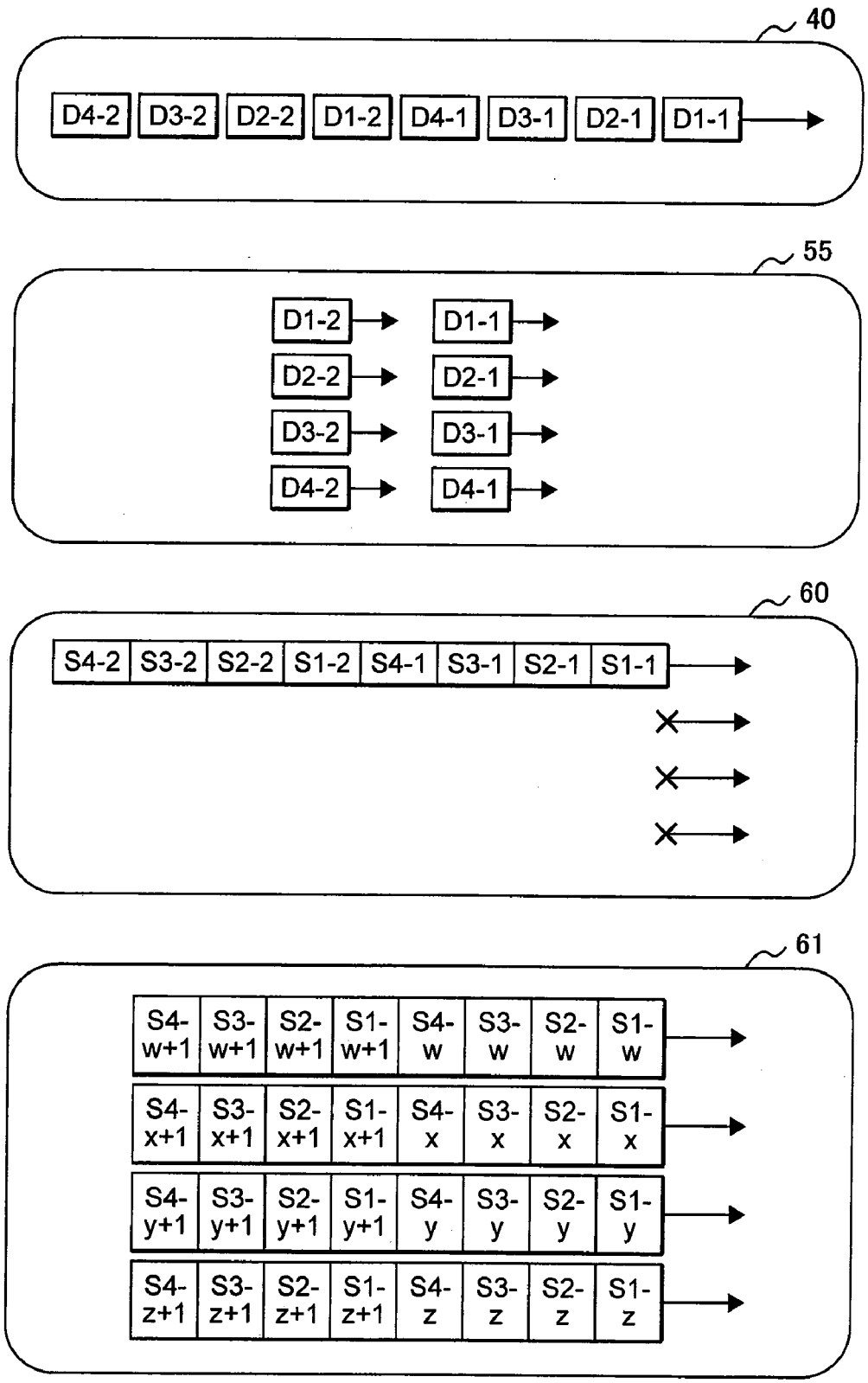
FIG. 5 is a diagram showing a relationship example between a packet and a cell payload length.

As a first embodiment, a configuration example of a packet transmission device using a multi-plane switch fabric system is shown in FIG. 1. The packet transmission device includes N ingress network processors 50 (50-1 to 50-N) that analyze variable-length packets for N input lines and provide results of address retrieval, etc., N distribution units 100 (100-1 to 100-N) that receive the variable-length packets attached with the analyzed information and divide and transmit them into fixed-length cells, and M switching units 200 (200-1 to 200-M) each switching the cells independently, N reordering units 300 (300-1 to 300-N) that reassemble the packets from the cells in a transmitted order from the distribution units 100-1 to 100-n, and N egress network processors 60 (60-1 to 60-N) that perform header correction, etc., required for the packets (N and M are an integer).

Between those, a switch fabric system is configured of the distribution units 100-1 to 100-N, the switching units 200-1 to 200-M, and the reordering units 300-1 to 300-N, which is an object of the first embodiment. In another configuration, the distribution units 100-1 to 100-N may be included in a portion of the ingress network processors 50-1 to 50-N or the reordering units 300-1 to 300-N may be included in a portion of the egress network processors 60-1 to 60-N, but there is no essential difference therebetween.

Figure 6:
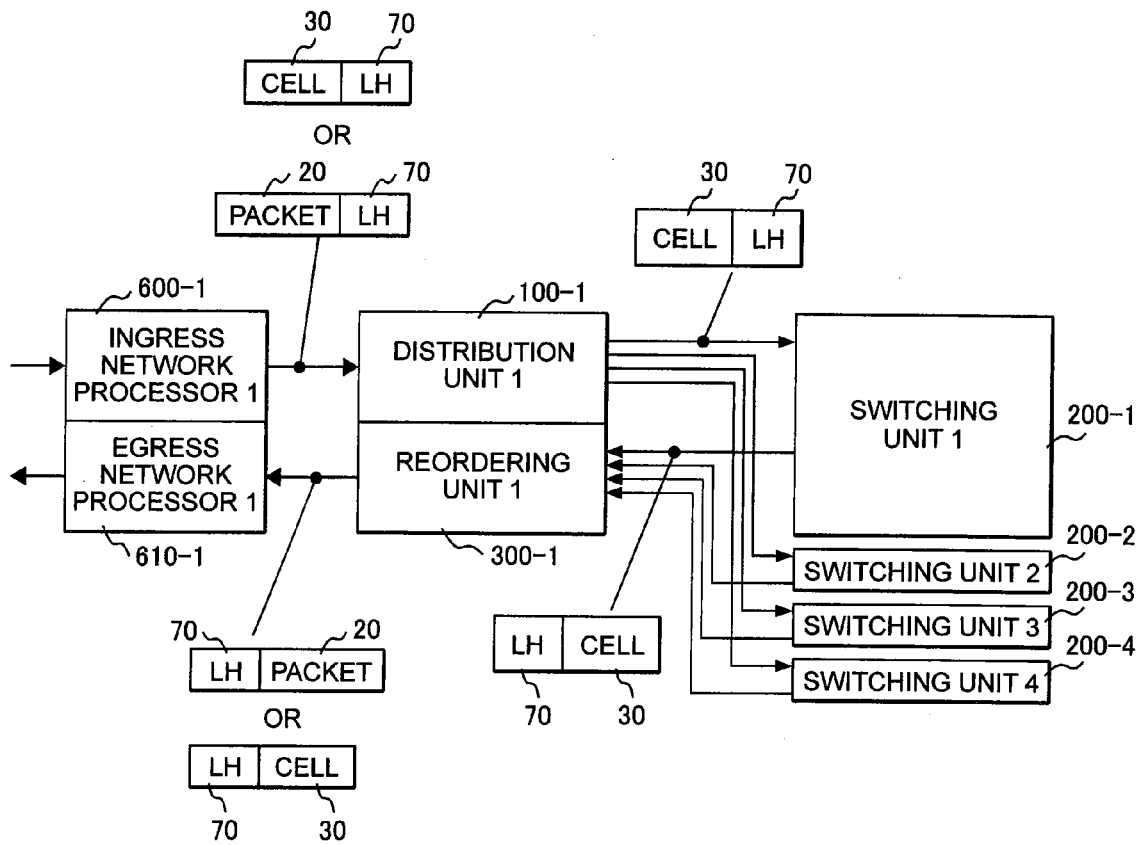
FIG. 6 is a diagram showing a relationship between a cell attached with a link header and a block where the aspect of the configuration of FIG. 1 according to the first embodiment is changed.
Figure 7:
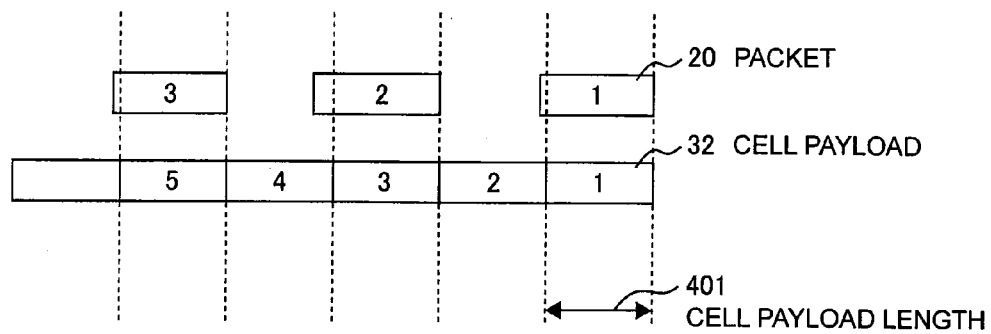
FIG. 7 is a diagram showing a relationship example between the cell payload length and the packet in the case where the division loss of the packet is large.

Next, a method of suppressing the division loss of the switch and the division loss of the packet in the first embodiment to the minimum requirement will be described with reference to a relationship diagram between a cell attached with a link header and each part shown in FIG. 6, a correlation diagram between a packet and a cell payload length shown in FIG. 11, a block diagram of a configuration example inside one of the distribution units 100-1 to 100-N shown in FIG. 13, a block diagram of a configuration example inside one of the reordering units 300-1 to 300-N shown in FIG. 14, and a block diagram of a configuration example inside one of the switching units 200-1 to 200-M shown in FIG. 15.

First of all, the contents shown in FIG. 6 will be described. FIG. 6 is a diagram showing the multi-plane cell switch fabric system of FIG. 1 viewed from another perspective and for convenience of explanation, shows only input and output lines in the network processor, the distribution unit, and the reordering unit. Herein, the ingress network processor 600-1 and the egress network processor 610-1 are appropriately implemented on the same LSI. In the case of another LSI, they are implemented to be adjacent to each other. Similarly, the distribution unit 100-1 and the reordering unit 300-1 are appropriately implemented on the same LSI. In the case of another LSI, they are implemented to be adjacent to each other. Although data is transmitted between the ingress network processor 600-1 and the distribution unit 100-1 and between the egress network processor 610-1 and the reordering unit 300-1 in a packet unit, in some cases, the packet may be divided in a cell unit and then, transmitted in the same order as the original packet (even with a cell unit, the transmission is logically performed in packet units). FIG. 6 shows a link header 70 provided with a packet 20 or a cell 30 and performing the transmission between both devices.

Herein, the link header 70 is header information to transmit data between the devices (that is, on the link), and can be used to show the contents of the included cell, or to transmit back pressure information, etc., of the device. Similarly, data is transmitted between the distribution unit 100-1 and each switching unit 200-1 to 200-4 and each switching unit 200-1 to 200-4 and the reordering unit 300-1 in a cell unit, and this cell 30 is provided with the link header 70 between the devices. In the first embodiment, the method of transmitting the back pressure information on each device by the link header 70 will be described with reference to the detailed configuration with the distribution unit 100-1 and the reordering unit 300-1. Further, in order to transmit the back pressure information, a configuration where a back pressure dedicated line is installed between each part can be adopted.

Next, the correlation of the packet and the cell payload length will be described with reference to FIG. 11. The distribution unit 100-1 buffers a packet 20A including the received various addresses by the distribution unit 100-1, arranges a packet 20B, which is classified for each address, for each packet align length 410, and forms the cell payload divided by a cell payload length 411. Cells equal to the number of switching units are generated and output whenever the cell payload corresponding to a switching unit length 412 is collected.

Since the cell payload length 411 is a value that is an integer multiple (however, twice or more) of the packet align length 410, there is a relationship of (cell payload length 411)= (product of (packet align length 410) and K) (K is an integer of two or more). Further, the switching unit length 412 has a relationship of (switching unit length 412)=(product of (cell payload length 411) and M) if the number of switching units 200-1 to 200-M is M.

Herein, since the cell payload length 411 is a value that is an integer multiple (that is, twice or more) of the packet align length 410, the cell payload can be provided with the plural packets 20B after division. In order not to complicate the process of reassembling the packets from the cells by the reordering unit 300-1 and not to require a large memory for protecting the packets to be included in the distribution unit 100-1, it is preferable that the number of packets included in one cell is about two at the most. In other words, it is preferable that the packet align length 410 or the cell payload length 411 have an extremely large value.

As a preferable example, when an Ethernet packet having a standard size (64 bytes to 1518 bytes) is treated and the analyzed information generated by the ingress network processor 600-1 is 32 bytes, if the packet align length 410 is 32 bytes and the cell payload length 411 is 128 bytes (four times as large as the packet align length 410), only two packets at the most are included in one cell.

Figure 13:
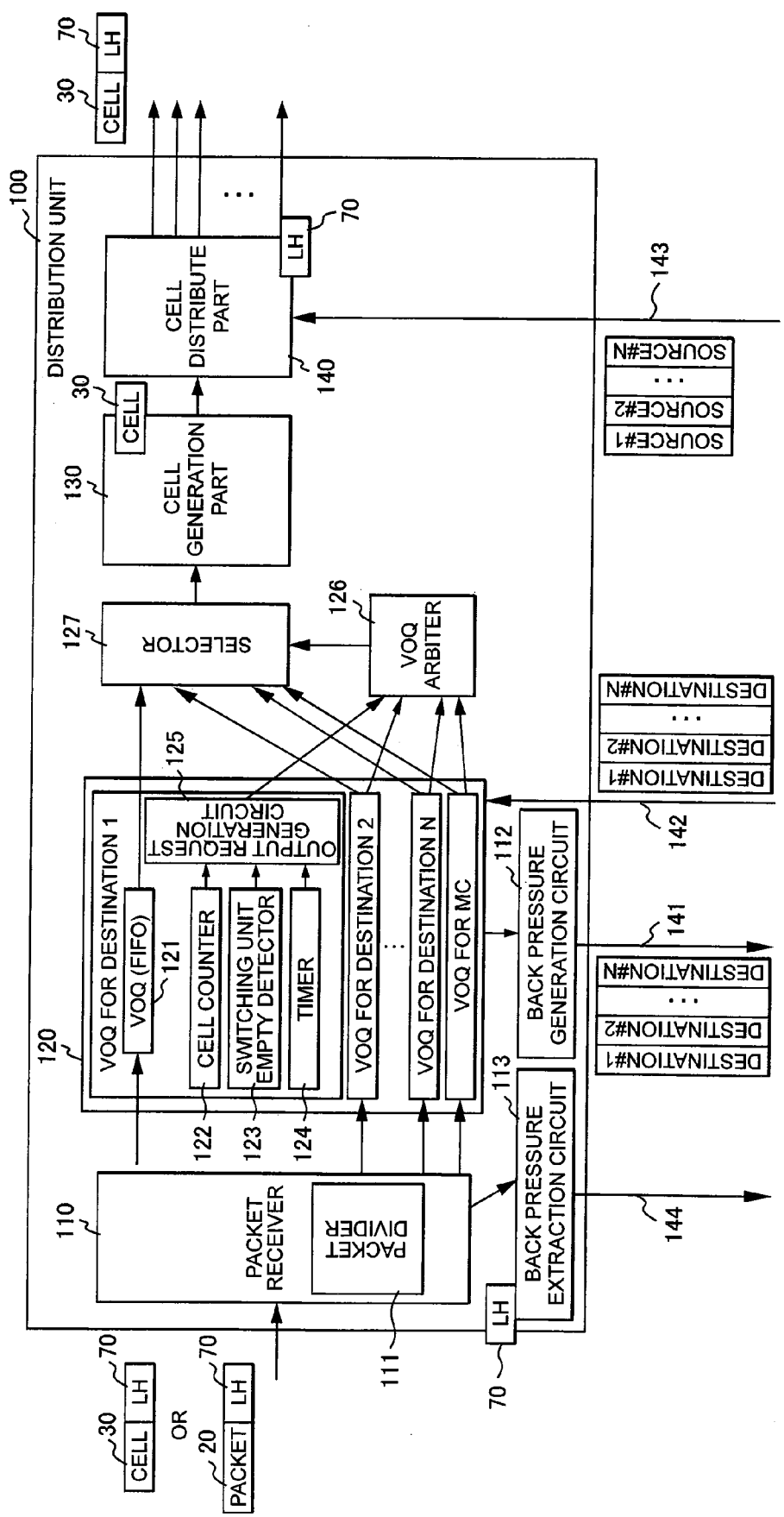
FIG. 13 is a block diagram showing a configuration example of a distribution unit according to the first embodiment.

In order to consider various implementing methods, one embodiment of the operation to arrange the packet head to the packet align length 410 and the operation to divide the cell into the cell payload length 411 is shown in FIG. 13. The distribution unit 100-1 that is a premise of the configuration includes a packet receiver 110, a back pressure generation circuit 112, a back pressure extraction circuit 113, and a group of multiple virtual output queues (VOQs) 120 for each address and for a multicast (MC), a VOQ arbiter 126, a selector 127, a cell generation part 130, and a cell distribute part 140. The functional operations of these blocks will sequentially be described as follows.

Figure 11:
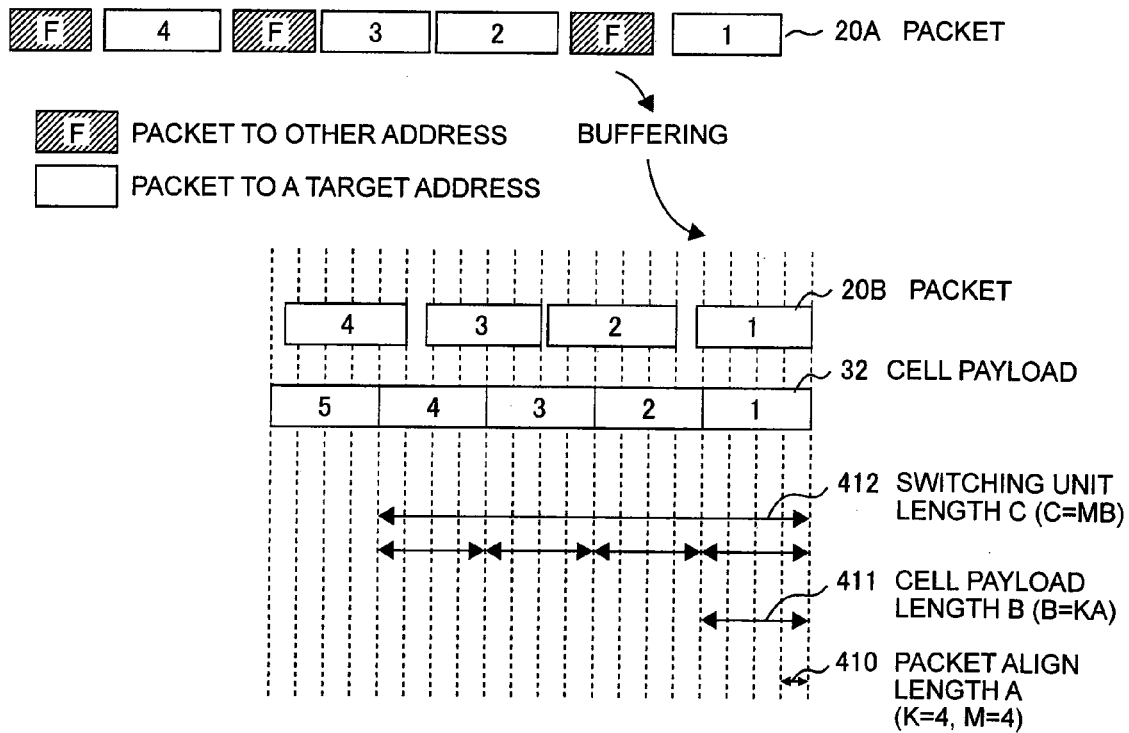
FIG. 11 is a diagram showing a correlation example between the packet and the cell payload in the first embodiment.

If the packet receiver 110 in the distribution unit 100 receives the packets (packet 20 or cell 30), it divides them into the link header 70 and the received packet 20A (see FIG. 11). The link header 70 is passed to the back pressure extraction circuit 113, which extracts back pressure information 144 of an egress network processor 610-1 and transmits it to the reordering unit 300-1 (see FIG. 6) that is implemented on the same LSI or is implemented near the LSI.

Moreover, the packet receiver 110 includes a packet divider 111 and divides the received packet 20A in the packet align length 410 unit and records it to the VOQ 120 of the corresponding address. In other words, the VOQ 120 records data in the packet align length unit. If the packet division data corresponding to the cell payload length 411 are collected, they become one cell payload. The plural packets can be included in one cell payload by this operation.

As can be clearly appreciated from FIG. 13, each VOQ 120 includes a FIFO queue 121 that is a main body of the VOQ and maintains the cell payload, a cell counter 122, a switching unit empty detector 123, a timer 124, and an output request generation circuit 125. The number of cells counter 122 counts the number of cells that are maintained in the VOQ. Further, the switching unit empty detector 123 receives an address corresponding to the target VOQ in the back pressure information 142 for each address of the switching units 200-1 to 200-4 transmitted through the reordering unit 300-1 to detect whether an area receiving cells remains in the address. The value of the cell counter 122 generally reaches the switching unit length 412 and when the switching unit empty detector 123 detects that the empty area receiving cells remains in the address corresponding to all the distribution units 200-1 to 200-4 based on the back pressure information 142, the output request generation circuit 125 transmits the output arbitration request to the VOQ arbiter 126.

The VOQ arbiter 126 selects any one of the VOQs 120 receiving the request and fixes the selector 127 to transmit the cell payloads equal to the number of switching lengths 412 from the corresponding VOQ 120 to the cell generation part 130.

Figure 12:
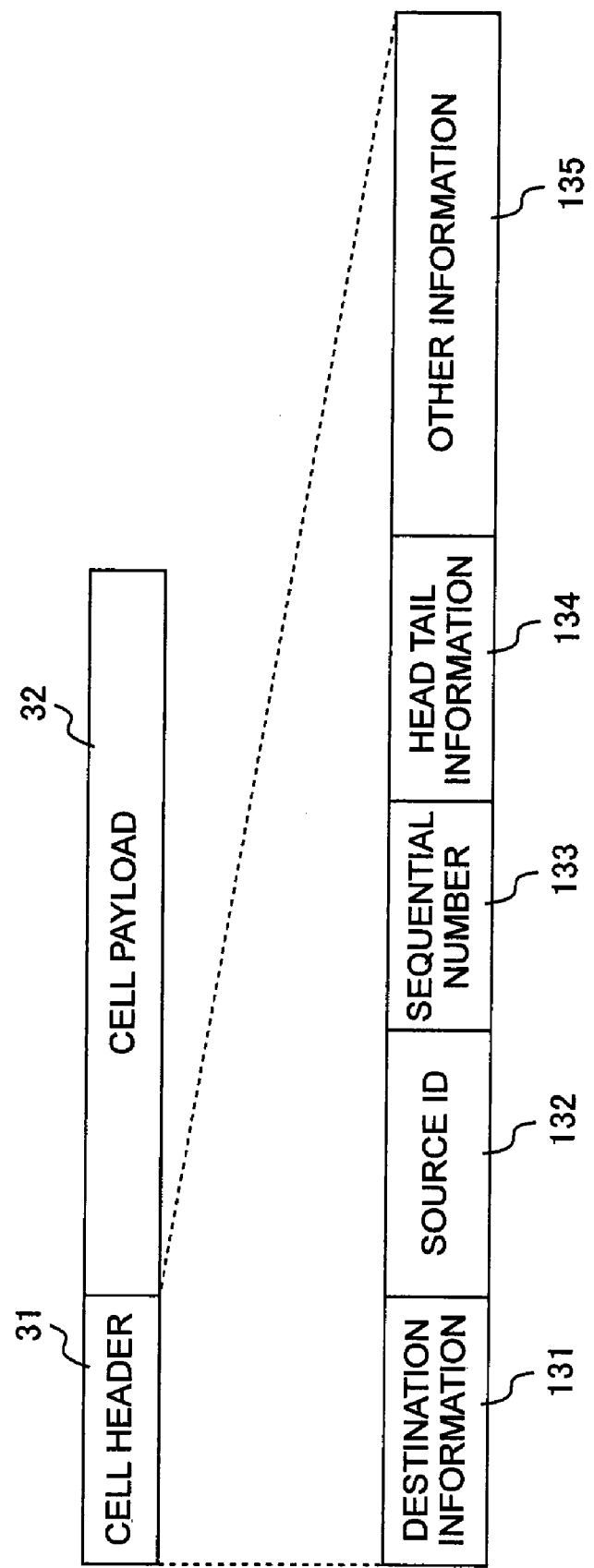
FIG. 12 is a diagram showing a configuration example of cell header according to the first embodiment.

The cell generation part 130 provides the cell header to the received cell payload to generate the cell. The information provided as the cell header may include at least destination information 131, a source ID 132, a sequential number 133, and packet head tail information 134 as shown in FIG. 12. Reference number 135 denotes other information. The destination information 131 is information showing whether the cell will be transmitted to any address of the switch fabric system and can be represented as the address bit map, for example. The source ID 132 is information used for discriminating whether the cell is transmitted from any transmission source (distribution unit 100-1) in the address and is, for example, a unique number for discriminating the distribution unit 100-1. The packet head tail information 134 means where the packet head is located when the inside of the cell payload is divided in the packet align length 410 unit or where the packet end is located when the inside of the cell payload is divided in the packet align length 410 unit. Moreover, each cell is also provided with a switching unit number showing the switching unit 200-1 to 200-4 that should be transmitted, but since it is preferable that the switching unit number can be recognized by the distribution unit 100-1, it can exist only as a signal inside the distribution unit 100-1 and does not need to be included in the cell header.

Herein, another embodiment of the operation of arranging the packet head in the packet align length 410 and the operation of dividing the cell into the cell payload length 411 will be described. As another method, the buffers corresponding to one cell payload are provided in the packet divider 111 in the same number as each VOQ inside the VOQ 120. The recording unit to the buffer is the packet align length 410 unit. The cell payload moves to the corresponding VOQ of the VOQ 120 in order from the buffers collected by the cell payload length 411 among these buffers in the packet align length 410 unit as well as the cell payload length 411 unit. In this case, the VOQ 120 becomes the cell payload length 411 unit even when it performs writing and reading. (In the above embodiment, the writing to the VOQ 120 is the packet align length 410 unit and the reading from the VOQ 120 is the cell payload length 411 unit).

Further, the method implementing the operation of arranging the packet head in the above-mentioned packet align length 410 and the operation of dividing it into the cell payload length 411 is different in terms of the implementation, but there is no essential difference therebetween. Moreover, it should be noted that a modified implementation method of the above-mentioned method is also possible.

However, in the cell 30 output from the distribution unit 100-1 that has the cell distribute part unit 140 of FIG. 13, the back pressure 143 for each transmission source of the reordering unit 300-1 transmitted to the switching units 200-1 to 200-4 is provided to the cell 30 as the link header 70, and each cell is transmitted to the switching units 200-1 to 200-4 according to a specified switching unit number. The cell can be equivalently distributed to all the switching units 200-1 to 200-M by assuming the switching unit number provided by the cell generation part 130 to be different values from each other with respect to M cells taken out of the VOQ at a time.

Further, there may be a situation where the subsequent packet of the corresponding address does not arrive in the state where some cell payloads have already collected in the VOQ. Although it is usually impossible that this situation permanently continues on the network, if this situation continues, the packet including the cell payloads collected in the VOQ is permanently prevented from being output from the switch fabric system.

In order to avoid this situation, a timer 124 built in each VOQ 120 is used. The timer 124 is returned to an initial state when the cell payloads are recorded in the state where there is nothing in the VOQ and when the cell payloads remain in the VOQ in the case where the cell payloads are read from the VOQ and starts. When the timer 124 reaches the specified value, if the switching unit empty detector 123 detects that there is the empty area that can receive the cells transmitted to the target address of all the switching units 200-1 to 200-4, even if the cell payloads of the VOQ are not collected by the switching unit length 412, the output request generation circuit 125 transmits the output arbitration request of the VOQ to the VOQ arbiter 126.

At this time, if the above-mentioned output arbitration request is received, the cells are distributed and transmitted one by one to the number of switching units 200-1 to 200-4 that corresponds to the number of collected cell payloads. The cell payload corresponding to the tail part of the packet collected in the VOQ can be transmitted to the reordering unit 300-1 of the address, by setting an appropriate time-out by this operation. Moreover, if the VOQ empties, the timer 124 is returned to the initial state and stops.

In the description until now, operation is very efficient for unicast packets having one address. In the case of multicast packets having plural addresses, if the packet is divided into all the corresponding unicast packets before the packet receiver 110 in the distribution unit 100 records the packets to the VOQ 120 for each address, the above-mentioned technique can be used as it is.

In addition, in the case of a multicast packet, the consecutive multicast packets of the same address are made into the cell payloads by using the packet align length 410 and the cell payload length 411 and the cell is distributed in a unit of the number of the switching units. At this time, even when the target cell does not come up to the number of the switching units, the distribution unit 100 may perform the distribution. This can be achieved by a similar means to one performing the time out process in the case of the unicast.

According to the process of these multicast packets, the effective switching capacity decreases more than in the case of a unicast packet, but if the percentage occupied by all the multicast packets is generally small, it is within the sufficiently allowable range.

Further, the back pressure generation circuit 112 in the distribution unit 100 detects the congestion condition of the group of the VOQs 120, generates the back pressure information 141 for each VOQ of the distribution unit 100, and transmits it to the pair of reordering units 300 that are implemented on or near the same LSI. The back pressure information 141 is finally transmitted to the ingress network processor 50-1 through the reordering unit 300-1 and the egress network processor 60-1 and used for arbitrating the output from the VOQ inside the ingress network processor 50-1.

Next, one example of a configuration of the switching units 200-1 to 200-M in the first embodiment will be described with reference to FIG. 15. Since each of the switching units 200-1 to 200-M has N receiving ports and N output ports and is operated independently from the others, the switch fabric system becomes a multi-plane cell switch fabric system including the asynchronous switching unit, when viewed in a general perspective.

Each of the switching units 200 divides the received cells into the cell 30 and the link header 70 (LH#1, LH#2, LH#3, and LH#4) and transmits a portion of the cell 30 to the switching circuit 210 and the link header 70 to the back pressure extraction circuit 211, respectively. The back pressure extraction circuit 211 is included in the link header 70, recognizes the back pressure information for each transmission source (transmission source #1, transmission source #2, transmission source #3, and transmission source #4) of each reordering unit 300 received through the distribution unit 100, and transmits it to the switching circuit 210. Further, the switching circuit 210 performs the control so that, the cell 30 transmitted from the same transmission source is controlled source controls does not fall behind the cell 30 from the subsequent same transmission source.

The switching circuit 210 collects once the cells 30 for each reordering unit 300 that becomes an address, referring to the destination information 131 included in the cell header of the received cell 30. Thereafter, the back pressure information for each transmission source of the reordering unit 300 transmitted from the back pressure extraction circuit 211 is examined and one of the cells of the transmission source without the back pressure is selected and transmitted. Further, the switching unit 200 includes the back pressure generation circuit 212 and detects the congestion degree for each address of the switching circuit 210 to generate the back pressure information for each address and generate the link header 70 for output, thereby providing them when the cell 30 is transmitted.

The cells from the plural switching units 200 reach the reordering unit 300 of the address. The cells are reached from the same switching unit 200 in the defined order if only any one transmission source is considered. However, since the order for any one transmission source is not guaranteed between the different switching units 200, the reordering unit 300 needs to reassemble the packet after appropriately arranging the order of the cell.

Figure 14:
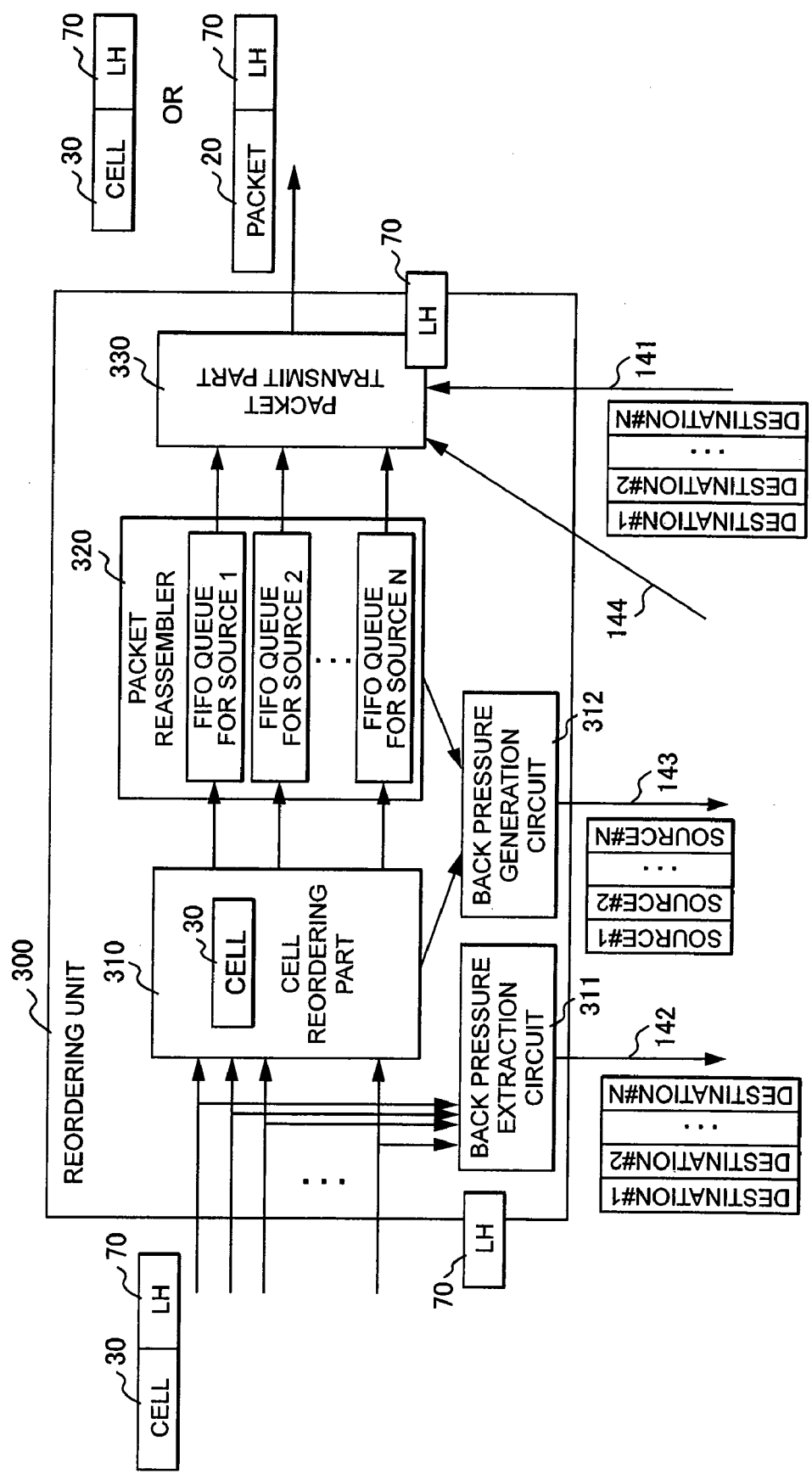
FIG. 14 is a block diagram showing a configuration example of a reordering unit according to the first embodiment.
Figure 15:
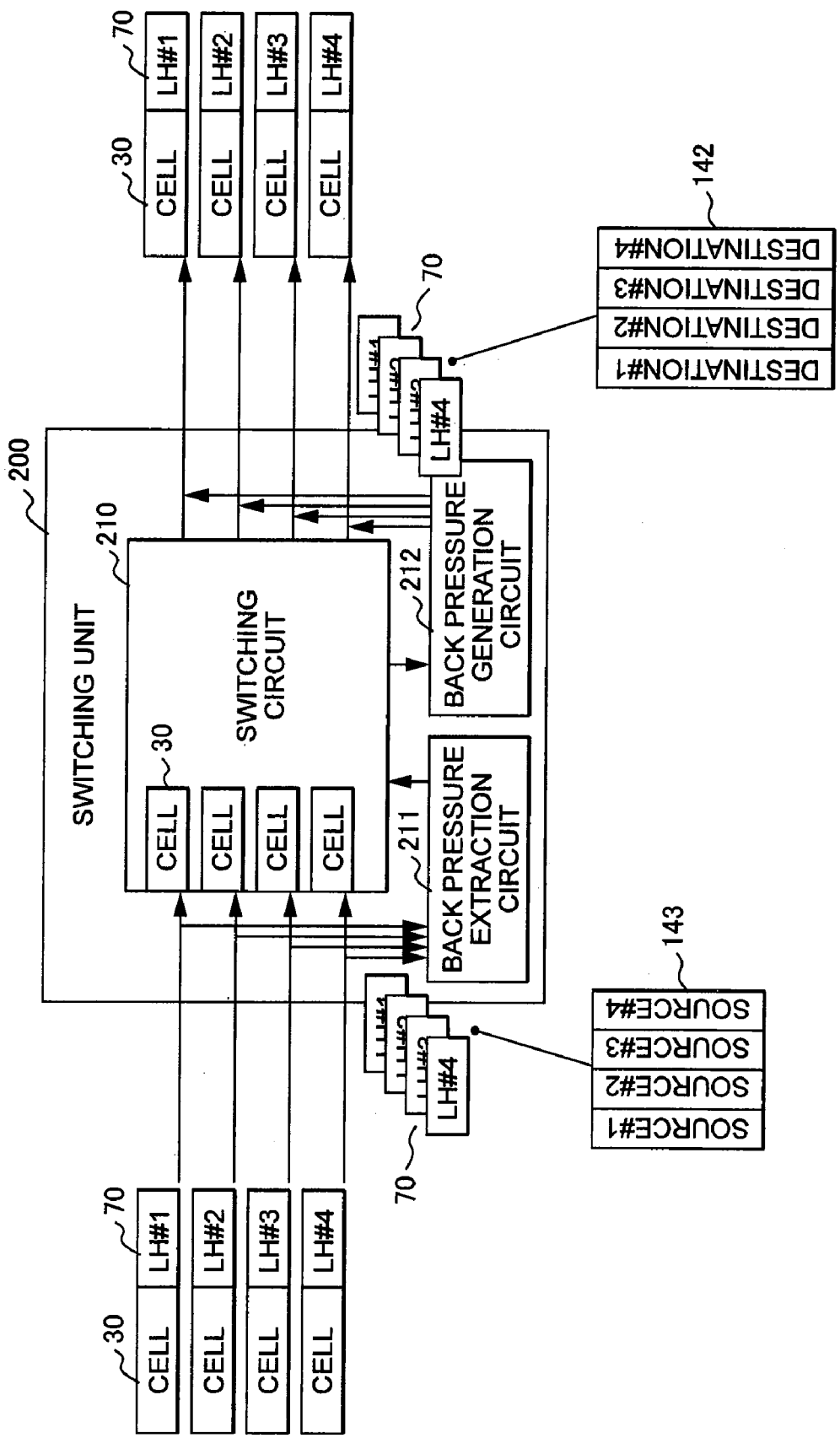
FIG. 15 is a block diagram showing a configuration example of a switching unit according to the first embodiment.

FIG. 14 is a block diagram showing one configuration example inside the reordering unit 300-1 in the first embodiment. The reordering unit 300 includes a cell reordering unit 310, a back pressure extraction circuit 311, a back pressure generation circuit 312, a packet reassembler 320 including an FIFO queue for each transmission source, and a packet transmit part 330.

When the cells are received, the reordering unit 300 passes the link header 70 to the back pressure extraction circuit 311 and passes the cell 30 to the cell reordering part 310, respectively.

The back pressure extraction circuit 311 extracts the back pressure information 142 (address #1, address #2, address #3 - - - address #N) for each address of the above-mentioned switching unit 200 and transmits it to the pair of distribution units 100 that are implemented on or near the same LSI.

Moreover, the back pressure generation circuit 312 generates the back pressure information 143 (transmission source #1, transmission source #2, transmission source #3 - - - transmission source #N) corresponding to the transmission source, referring to the internal logic or memory usage of the cell reordering part 310 and the packet reassembler 320 and transmits it to the switching unit 200 through the pair of distribution units 100 that are implemented on or near the same LSI.

The cell reordering unit 310 receives the cell 30 from each switching unit 200 and reorders the order of the cell for each transmission source in the transmitted order in the distribution unit 100 and transmits the cell to the corresponding FIFO queue in the packet reassembler 320. In detail, the cell is classified for each transmission source by the source ID 132 included in the cell header shown in FIG. 12. The order of the cell is reordered by selecting the cell having the sequential number 133 to be expected among the cells.

Each FIFO queue of the packet reassembler 320 is the packet align length 410 unit in reading but is a cell unit in recording, that is, the cell payload length 411 unit. For this reason, the cell reordering unit 310 that is responsible for the process until the recording to the packet reassembler 320 is performed can secure a sufficient processing time for the order reordering process of the complicated cells.

Each FIFO queue of the packet reassembler 320 cuts out the cells in the packet align length 410 unit by using the packet head tail information 134 of the received cell header, thereby reassembling the original packet.

Thereafter, the packet transmit part 330 selects one FIFO queue that can reassemble the packet among the FIFO queues of the packet reassembler 320. It is confirmed that the power output side egress network processor 610-1 is ready to accept, by referring to back pressure information 144 on power output side network processor 610-1 via input side ingress network processor 600-1 that is transmitted from the pair of distribution units 100 that are implemented on or near the same LSI. The back pressure information 141 (address #1, address #2, address #3, and address #4) of the VOQ in the distribution unit 100 is provided as the link header at the corresponding packet and outputs to the outside. Physically, the packet 20 may be divided as the cell 30.

According to the first embodiment described above, the multi-plane cell switch fabric system can effectively transmit the packet to the desired address from the distribution unit 100 through the switching unit 200 while minimally suppressing the decrease of the effective switching capacity by the operation of the reordering unit 300.

Figure 8:
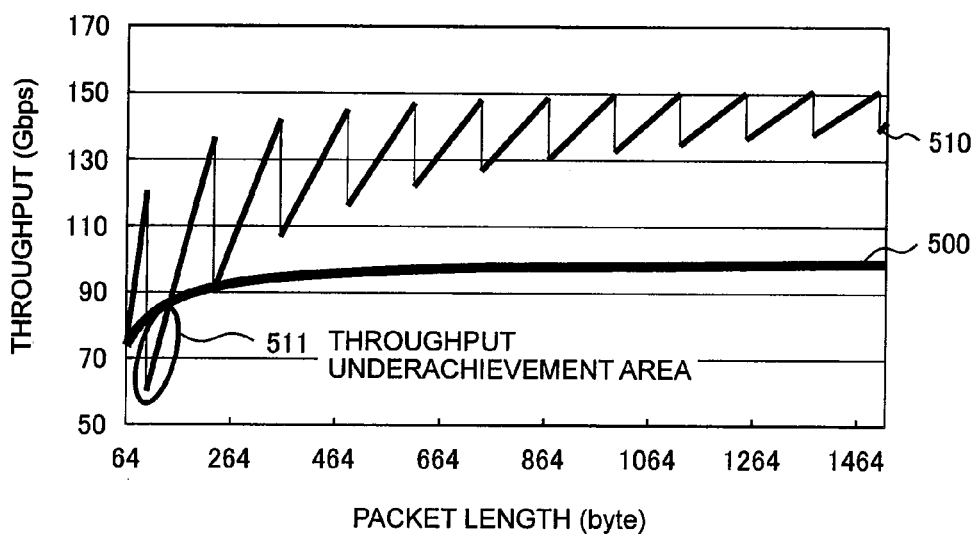
FIG. 8 is a diagram showing a correlation example between the throughput and the packet length in the case where the cell payload length is large.
Figure 9:
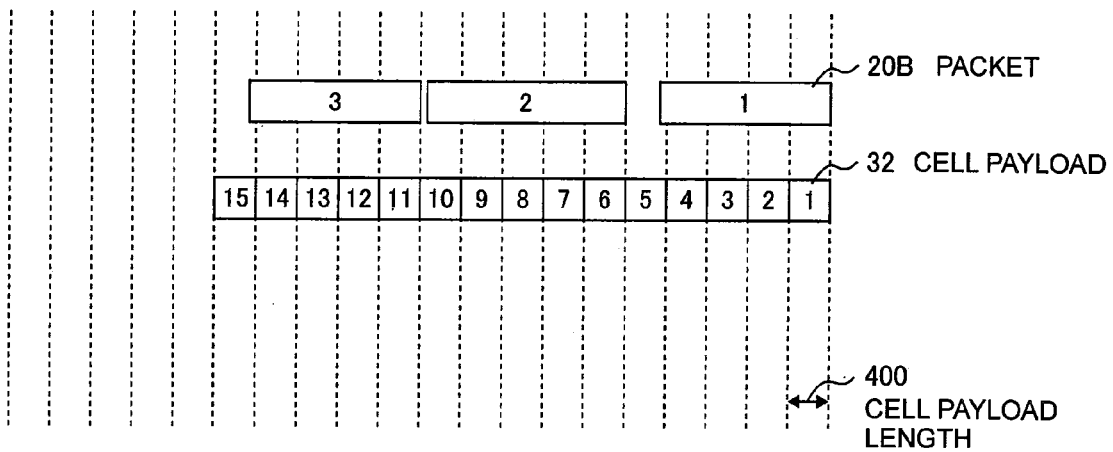
FIG. 9 is a diagram showing a relationship example between the cell payload length and the packet in the case where the cell payload length is small.
Figure 10:
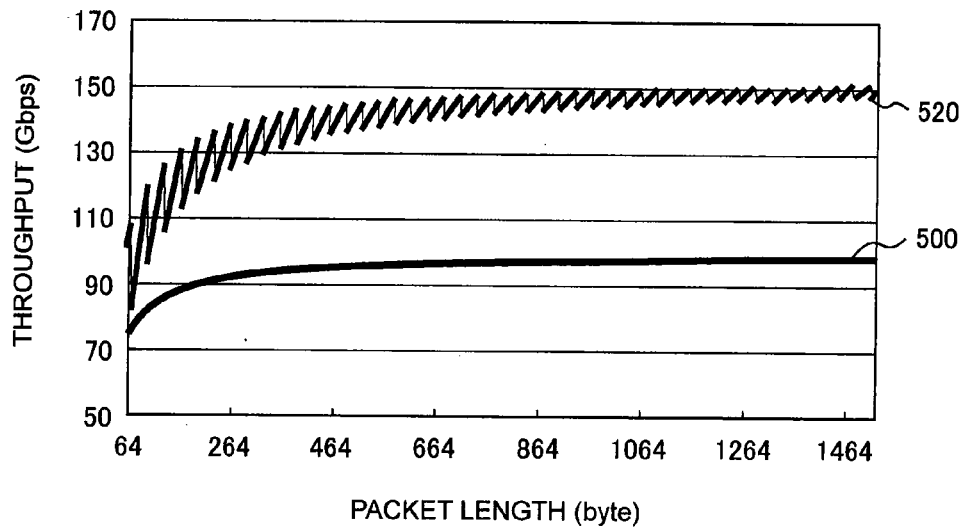
FIG. 10 is a diagram showing a correlation example between the throughput and the packet length in the case where the cell payload length is small.

In more detail, in a graph that shows the relationship between the packet length and the throughput shown in FIG. 8, the same effect as a case where there is no packet having the packet length as shown in a portion of round sign 511 can be achieved. In other words, the same effect as a case where there is no packet length in the area where the core effective speed 510 falls below the line effective speed 500 can be achieved.

Second Embodiment

The first embodiment (1) describes in detail the method for minimally suppressing both the division loss of the packet and the division loss of the switch in the multi-plane cell switch fabric system. Herein, it may suffice to suppress only the division loss of the switch depending on the line speed or the logic operation frequency that are processed by the switch fabric system. Therefore, a second embodiment (2) will describe a method for minimally suppressing only the division loss of the switch.

The second embodiment (2) can be realized by slightly changing the first embodiment. In detail, the first embodiment prevents the division loss of the packet as the cell payload length 411 having a value of the integer multiple being twice or more as large as the packet align length 410. Therefore, if the packet align length 410 and the cell payload length 411 have the same value, the portion of the division loss of the packet described in the first embodiment can be omitted. For example, in the description of the distribution unit 100 of FIG. 13, the packet divider 111 in the packet receiver 110 is needed, but in the second embodiment, the packet divider 111 is not needed. In other words, the writing unit to each VOQ 120 becomes the cell payload length 411. In other words, since there is no the packet divider 111, the plural packets are not included in the cell payload. Other changes are not needed at all and a multi-plane cell switch fabric system for easily suppressing only the division loss of the switch to the minimum can be realized.

A multi-plane cell switch fabric system according to various kinds of embodiments was described in detail above. Further, the foregoing description is merely one mode of the embodiment and it is needless to say that various changes are possible without departing from the technical thought and scope of the present invention.

The multi-plane cell switch fabric system according to the above-mentioned present invention can use the system needed to perform the data switching using a large-capacity line, for example. It is the most suitable for the switch fabric system in the packet device that is represented by the router or the switch. In addition, use of the switch fabric system, etc., in the device of the server or the storage can be considered.

What is claimed is:

1. A multi-plane cell switch fabric system comprising:
a plurality of distribution units corresponding to inputs of the switch fabric system;
a plurality of reordering units corresponding to outputs of the switch fabric system; and
a plurality of switching units each asynchronously performing data switching from the plurality of distribution units to the plurality of reordering units,
wherein each distribution unit includes:
a mechanism that arranges input variable-length packets at a first division length unit classified for each address;
a mechanism that divides the packets into fixed-length cell payloads at a second division length unit that is an integer multiple being twice or more as large as the first division length unit and forms the fixed-length cell by providing, as a cell header, at least destination information, a source ID, a sequential number, and packet head/tail information to each of the cell payloads to indicate where a packet head and a packet end of the packets are located; and
a mechanism that distributes the cells to all the switching units one by one whenever the cells are collected to be the same number as the plurality of distribution units, and each reordering unit includes:
a mechanism that classifies the cells by the source ID of the cell received through the plurality of switching units, and reorders the sequential number in an original order;
a mechanism that reassemble the packets by the packet head/tail information of the cell; and
a mechanism that outputs the reassembled packets,
wherein each distribution unit includes a mechanism that distributes each cell to different switching units one by one even when the cells equal to the number of switching units are not collected in the case where the packets following the second packet of the same address have not reached even after a specified time elapses.

2. The multi-plane cell switch fabric system according to claim 1, wherein the distribution unit includes a mechanism that divides multicast packets into unicast packets including a target address and divides the cells when the multicast packets are received as the packets.

3. A multi-plane cell switch fabric system comprising:
a plurality of distribution units corresponding to inputs of the switch fabric system;
a plurality of reordering units corresponding to outputs of the switch fabric system; and
a plurality of switching units each asynchronously performing data switching from the plurality of distribution units to the plurality of reordering units,
wherein each distribution unit includes:
a mechanism that arranges input variable-length packets at a first division length unit classified for each address;
a mechanism that divides the packets into fixed-length cell payloads at a second division length unit that is an integer multiple being twice or more as large as the first division length unit and forms the fixed-length cell by providing, as a cell header, at least destination information, a source ID, a sequential number, and packet head/tail information to each of the cell payloads to indicate where a packet head and a packet end of the packets are located; and
a mechanism that distributes the cells to all the plurality of switching units one by one whenever the cells are collected to be the same number as the plurality of switching units, and
each reordering unit includes:
a mechanism that classifies the cells by the source ID of the cell received through the plurality of switching units, and reorders the sequential number in an original order;
a mechanism that reassemble the packets by the packet head/tail information of the cell; and
a mechanism that outputs the reassembled packets,
wherein each distribution unit includes a mechanism that divides the cells up to the consecutive multicast packets including the same multicast address in the case where the multicast packets are received as the packets and distributes each of the cells to each switching unit one by one even when the cells equal to the number of switching units are not collected even after a specified time elapses.

4. A multi-plane cell switch fabric system comprising:
a plurality of distribution units;

a plurality of reordering units; and a plurality of switching units each asynchronously performing data switching from the plurality of distribution units to the plurality of reordering units, wherein each distribution unit classifies input variable-length packets for each address, makes the variable-length packets to the same address one or more cell payloads of fixed-length, forms a fixed-length cell by providing, as a cell header, at least destination information, a source ID, a sequential number, and packet head/tail information to each of the cell payloads to indicate where a packet head and a packet end of the packets are located, and distributes the cells to all the switching units one by one whenever the cells are collected to be the same number as the switching units, and wherein each distribution unit divides multicast packets into unicast packets including a target address and divides the cells when the multicast packets are received as the variable-length packets, and wherein each distribution unit distributes each cell to different switching units one by one even when the cells equal to the number of the plurality of switching units are not collected in the case where the packets following the second packet of the same address have not reached even after a specified time elapses.

5. The multi-plane cell switch fabric system according to claim 4, wherein each of the plurality of reordering units reassembles the packets based on the cell header of the cell received through the plurality of switching units and outputs the reassembled packets.

6. The multi-plane cell switch fabric system according to claim 5, wherein the reordering unit classifies the cells by the source ID of the cell received through the plurality of switching units, reorders the sequential number in an original order and reassembles the packets by the packet head/tail information of the cell, and outputs the reassembled packets.

7. A multi-plane cell switch fabric system comprising:

a plurality of distribution units;

a plurality of reordering units; and a plurality of switching units each asynchronously performing data switching from the plurality of distribution units to the plurality of reordering units, wherein each distribution unit classifies input variable-length packets for each address, makes the variable-length packets to the same address one or more cell payloads of fixed-length, forms a fixed-length cell by providing, as a cell header, at least destination information, a source ID, a sequential number, and packet head/tail information to each of the cell payloads to indicate where a packet head and a packet end of the packets are located, and distributes the cells to all the switching units one by one whenever the cells are collected to be the same number as the switching units, and wherein each distribution unit divides multicast packets into unicast packets including a target address and divides the cells when the multicast packets are received as the variable-length packets, and wherein each distribution unit divides the cells up to the consecutive multicast packets including the same multicast head and distributes each of the cells to the different switching unit one by one even when the cells equal to the number of switching units are not collected even after a specified time elapses in the case where the multicast packets are received as the variable-length packets.

* * * * *